United States Patent Office 2,862,026
Patented Nov. 25, 1958

2,862,026

ISOMERIC DERIVATIVES OF MONOCYCLIC DIOLEFINIC TERPENES

Karl Büchner, Oberhausen-Sterkrade, Otto Roelen, Oberhausen-Holten, and Heinrich Schwarz, Oberhausen-Sterkrade, Germany, assignors to Ruhrchemie Aktiengesellschaft, Oberhausen-Holten, Germany, a corporation of Germany No Drawing. Application August 3, 1954
Serial No. 447,670

Claims priority, application Germany August 6, 1953

2 Claims. (Cl. 260—514)

This invention relates to isomeric derivatives of monocyclic, diolefinic terpenes.

The invention more particularly relates to the production of isomeric dimethylal, dimethylol and preferably dicarboxylic acid derivatives of monocyclic diolefinic terpenes.

It is known that carbon monoxide and hydrogen may be catalytically added to the unsaturated double bonds of an olefin in accordance with the oxo-synthesis to produce aldehydes. It is also known that carbon monoxide and hydrogen may be simultaneously catalytically added under pressure to both double bonds of a diolefin. This results in yields of more than 50%, and often of more than 70% of dialdehydes, which may, by reduction, be converted into the corresponding dialcohols, which, by oxidation, or by a treatment with molten alkali, may in turn be converted into the corresponding dicarboxylic acids.

It was, however, generally believed that in connection with the oxo-synthesis carbon monoxide and hydrogen would not add to a tertiary carbon atom.

It has now been very surprisingly found that two isomeric dimethylal compounds may be produced from a monocyclic diolefinic terpene hydrocarbon having the empirical formula $C_{10}H_{16}$ by catalytically adding carbon monoxide and hydrogen. The term "methylal" as it appears in the application describes the aldehyde group.

The starting monocyclic diolefinic terpene hydrocarbon is preferably dipentene or limonene and the isomeric dimethylal compounds produced are isomers of menthane dimethylal. The menthane dimethylal isomers may be converted into menthane dimethylol isomers, which, in turn, may be converted into menthane dicarboxylic acid isomers.

The addition of carbon monoxide and hydrogen is commercially effected under the conditions of the so-called Oxo synthesis as disclosed for the first time by U. S. A. Patent No. 2,327,066 and in many other patents. In this process, the olefinic starting material may be diluted with aromatic, aliphatic or hydroaromatic hydrocarbons. The process of the invention uses $C_6$–$C_8$ hydrocarbons, especially heptane, cyclohexane and homologues of cyclohexane as diluents. These hydrocarbons have a boiling point of below 80° C. at a pressure of 100 mm. Hg.

Reduced cobalt catalysts, for example, as suggested for the catalytic carbon monoxide hydrogenation may be used as catalyst for the addition of carbon monoxide and hydrogen. However, any other catalyst suggested in the technical literature for the performance of the Oxo synthesis may also be used. If aqueous cobalt salt solutions such as acid cobalt salt solutions are used as the catalyst, the optimum reaction temperature is about 150° C. and the most suitable reaction pressures range between 150 and 250° C. However, any higher gas pressure may be used.

Moreover, all catalysts which supply cobalt carbonyl hydrogen as, for example, metallic cobalt, cobalt oxides, cobalt carbonates, organic cobalt compounds such as cobalt acetate and cobalt naphthenate are suited for the addition of carbon monoxide and hydrogen.

In the process of the invention, the terpenes to be processed, especially dipentene and limonene, are diluted with the hydrocarbons mentioned in a ratio of 1:3. The addition of water gas is effected under a pressure of 190 kg./square centimeter and at a temperature of 170° C. Solutions which contain cobalt salts and magnesium salts are used as the catalyst. The addition of water gas is effected in the presence of metallic iron powder, polymerization inhibitors, and emulsifiers. Polymerization is prevented, for example, with anthraquinone while alkyl aryl sulfonates are suitable emulsifiers.

After the termination of the addition of water gas, the aqueous phase which includes the catalyst is separated from the oily phase. The oily phase is converted with hydrogen into the corresponding methylol compounds using a pressure of 170 kg./square centimeter and a temperature of 230° C. This results in yields of between 60% and 70% of the theoretical yield. The by-products obtained include 20–30% of monomenthane methylol, 5–10% of menthane and 3–5% of polymeric compounds.

Due to the high reactivity of the aldehyde compounds, the separation of the two isomeric aldehydes is very difficult. In connection with the hydrogenation products of the dialdehydes, i. e., the dialcohols, the two isomers are distinctly recognizable by the boiling range. In distilling a dialcoholic product which has been obtained from limones by the catalytic addition of carbon monoxide and hydrogen and subsequent hydrogenation, it has been found that 35% of the dialcohol distils over at a constant temperature of 161° C. under a pressure of 0.4 mm. Hg while 65% of this dialcohol, under the same conditions, distils over at a temperature of 165° C.

Oxidation of the dialcoholic overall product in the conventional manner with chromium acid in the presence of about 100% acetic acid, followed by separation from the chromium deposit precipitated by means of alkali and treatment of the chromium-free acetic acid filtered off with mineral acid results in the formation of an isomeric carboxylic acid mixture, which can be separated into the two isomeric carboxylic acids by means of selective solvents and by selective crystallization.

The same result is obtained if the dialcohol fraction is melted at 200–260° C. under a slight nitrogen pressure with about 110% of its quantity of caustic potash calculated for both hydroxyl groups. The menthane dimethylol is added drop by drop to a solution of $Cr_2O_3$ in glacial acetic acid while constantly stirring and maintaining the temperature at 50° C. About 2.6 mol chromium oxide is used per mol menthane dimethylol. The oxidation is terminated at 70° C. by introducing air. The melting is effected with stirring and the hydrogen which splits off is continuously removed under pressure from the melting vessel. The menthane dimethylol is heated with solid sodium hydroxide, potassium hydroxide or mixtures thereof at 200–260° C. in an autoclave with the use of a nitrogen atmosphere while maintaining the gas pressure at 50 kg./square centimeters with the molar ratio of menthane dimethylol to alkali being preferably 1:2. However, other quantitative proportions of menthane dimethylol and alkali may also be used.

After the termination of the splitting off of hydrogen, water is forced into the melt while continuing the stirring. The paste formed thereby is removed from the melting vessel and completely dissolved in water. This results in the formation of a salt solution which, after neutralization of the excess alkali by means of mineral acid or carbon dioxide, may be decolorized with hydrogen in the presence of a nickel catalyst. The accompanying substances which are not present as carboxylic acid salts may be removed by a stage-wise extraction with paraffinic hydrocarbons of different chain lengths, as, for example, with octadecane, dodecane, and heptane. Thereafter, the salt solution may be converted into the free carboxylic acid by treatment with a mineral acid until a pH value of 2–3 is obtained.

The dicarboxylic acid mixture settles out as a sirupy mass at the bottom of the reaction vessel and may be dissolved by adding about the same quantity of benzene. The benzenic solution floating on top is separated from the salt solution and repeatedly washed with water until it is free from mineral acid. Following this, the benzene is distilled off and the remaining distillation residue is dissolved in about the same quantity of a mixture of 1 part of pentanone and 5 parts of heptane by heating with a reflux condenser. This mixture, upon cooling, forms a crystallized product, which, according to analysis, represents a dicarboxylic acid.

The remaining mother liquid of the crystallization is freed from solvent by distillation and the distillation residue is repeatedly extracted with heptane. After the complete removal of the extracting agent from the extraction residue there remains a viscous water-clear substance which is a dicarboxylic acid isomer. Except for their consistencies, the two isomeric dicarboxylic acids obtained only differ by their residual acid numbers.

The initial catalytic addition of the carbon monoxide and hydrogen to the monocyclic diolefinic terpene hydrocarbon, such as the dipentene, is effected under the conventional conditions for the oxo-synthesis, using the conventional temperatures, pressures, gas amounts, and catalysts.

The conversion of the dialdehydes into the dialcohols is effected under the conventional hydrogenation conditions for converting oxo-aldehydes to alcohols.

The isomeric di-substituted menthane derivatives produced from the dipentene in accordance with the invention have the following general formulae:

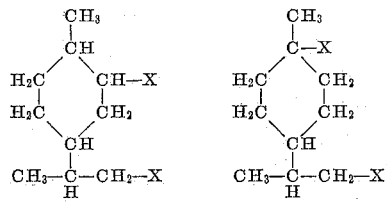

[1] 2 minutes.
[2] 15 minutes.

in which X is a methylal group in the case of the dimethylal compounds, a methylol group in the case of the alcoholic compounds, and a carboxy group in the case of the dicarboxylic acids.

When using the conventional nomenclature for the menthane, the isomerism, as may be seen, occurs, since one substituent is added to the 10 carbon atom in all cases, while the other substituent is added either to the 1-carbon atom or at the 2- or 6-carbon atom.

The isomeric dicarboxylic acids formed in accordance with the invention constitute novel compounds, which find use, for example, as esterification components for the production of polyesters and plasticizers.

The following examples are given by way of illustration and not limitation:

*Example 1*

The starting material was a dipentene which had the following characteristics:

Density at 20° C. _____ 0.846
Refractive index, $n_D^{20}$ _____ 1.4735
Molecular weight _____ 136
Kaufmann iodine number _____ [1] 362
Kaufmann iodine number _____ [2] 372
Ozone iodine number _____ 369
Neutralization number _____ 0
Ester number _____ 1.5
Hydroxyl number _____ 6
Carbonyl number _____ 0

[1] 2 minutes.
[2] 15 minutes.

1 liter of this dipentene was diluted with 4 liters of heptane. This mixture contained 857 gms. dipentene and 2790 gms. heptane. Together with 1000 cc. of an aqueous cobalt sulfate-magnesium sulfate solution containing 16 gms. of cobalt and 30 gms. of MgO per liter and having a pH value of 3.5, and 2 gms. anthraquinone, 0.2 gms. aryl alkyl sulfonate, and 50 gms. of iron powder, the dipentent-heptane mixture was filled into a stirring autoclave of horizontal construction having a capacity of 9.6 liters. Then water gas was forced into the autoclave until a pressure of 192 kg./sq. cm. was reached. The stirrer was started and the autoclave heated to 150° C. In doing so, the pressure increased to 283 kg./sq. cm., at which pressure the reaction started.

Within 30 minutes, the pressure dropped to 178 kg./sq. cm., while the temperature had increased to 172° C. Water gas from a cylinder was then continuously forced into the autoclave until a pressure of 192 kg./sq. cm. was attained, at which pressure a gas absorption could no longer be observed. In this manner, a total quantity of water gas corresponding to a pressure drop of 236 kg./sq. cm. had been absorbed within 4 hours. After cooling of the autoclave to about 30° C. and after having relieved the residual gas pressure, the catalyst solution was removed by withdrawing it at the lowermost point of the autoclave, and an aqueous suspension of a cobalt-magnesia-kieselguhr catalyst was added to the reaction product. The autoclave was again charged with hydrogen until a pressure of 173 kg./sq. cm. was reached and heated to 230° C., thereby splitting up the acetals present and converting the dissolved organo-metallic compounds into hydroxides. After the autoclave was cooled, the reaction product was filtered off from the catalyst and subjected to distillation. After having distilled off the diluent, the following fractions were obtained:

98–150° C. at 100 mm.: 81 gms.=7.95 wt. percent first runnings (methane and impurities of the starting product)

110–143° C. at 10 mm.: 280 gms.=28.5 wt. percent menthane monomethylol and menthene monomethylol 161–165° C. at 0.4 mm.: 627 gms.=60.6 wt. percent menthane dimethylol 165° C. at 0.4 mm.: 30 gms.=2.95 wt. percent resin (esters and higher polymers)

The monomethylol fraction had the following characteristics:

Hydroxyl number _____ 324 (333)
Neutralization number _____ 0
Ester number _____ 3
Iodine number _____ 33
Density at 20° C. _____ 0.920
Refractive index $n_D^{20}$ _____ 1.4740

The menthane dimethylol fraction had the following characteristics:

Hydroxyl number _____ 552
Neutralization number _____ 0
Ester number _____ 1.7
Refractive index, $n_D^{20}$ _____ 1.4900

100 gms. of the menthane dimethylol fraction obtained by the fractionation were added drop-wise, while stirring, to a mixture of 200 gms. chromic acid and 800 cc. glacial acetic acid in a 2 liter flask provided with a reflux condenser and a stirrer. In doing so, the temperature was maintained at 50° C. by external cooling and adjusting the rate at which the menthane dimethylol fraction was added. The reaction time was 2½ hours. Following this, the temperature was increased to 70° C. and an after-oxidation was effected for 4 hours by blowing in air while continuing the stirring.

After the termination of the reaction, the reaction mixture was neutralized with aqueous 20% NaOH and adjusted to a pH value of 9. The reaction mixture was then filtered off from the precipitated chromium-III-hydroxide deposit resulting in a yellowish colored filtrate. By adding mineral acid to the filtrate until a pH value of 2 was obtained, the dicarboxylic acid separated partly as an emulsion and partly as a solid substance at the bottom, while the color deepened somewhat.

The emulsion was extracted by shaking with benzene and the benzenic solution, after separation of the acidic solution, was repeatedly washed with water until the odor of free acetic acid had disappeared. The benzene was then distilled off from the dicarboxylic acids, which were dissolved with the same volume of a mixture of 1 part of pentanone and 5 parts of heptane while slightly heating at a reflux condenser. This mixture was allowed to cool. Thereby a solid substance crystallized, which, on account of a neutralization number and a saponification number of 488 and its elementary analysis:

63.0% C
8.9% H
28.1% O (by difference)

was identified to be dicarboxylic acid $C_{12}H_{20}O_4$. This dicarboxylic acid showed a clear melting point of 147° C., (clear melting point being defined as the temperature where the dicarboxylic acid was completely molten and clear in a melting-point tube). The residual acid number was 190.

The mother liquor left after the crystallization of the acid was freed from the solvent mixture (pentanone-heptane) by distillation, and the distillation residue was analyzed. The following characteristics were found:

| | |
|---|---|
| Neutralization number | 482 |
| Saponification number | 482 |
| C _____percent | 63.3 |
| H _____do | 8.6 |
| O _____do | [1] 28.1 |
| Residual acid number | 90 |

[1] (By difference.)

This isomer of the dicarboxylic acid produced was highly viscous and stringy.

Example 2

370 grams of the menthane-dimethylol fraction obtained in accordance with Example 1, together with 160 grams NaOH in the form of tablets, were heated to 200° C. in a copper-lined autoclave of 2.8 liters capacity, which was pressurized with a nitrogen pressure of 5 kg./sq. cm. Within 32 minutes after the beginning of the test and at 200° C. a pressure of 13 kg./sq. cm. was present. After additional 6 minutes and at 260° C. the pressure had reached 52 kg./sq. cm. The temperature was maintained at this level for further 30 minutes while the pressure was maintained at a constant level of 50 atmospheres gauge by continuously relieving the pressure exceeding 50 atmospheres gauge through a valve. After this time, a further increase in pressure was no longer observed and the melting experiment was terminated by discontinuing the heat supply.

Following this, 200 cc. of water were forced into the melt by means of nitrogen and the mass was stirred for 15 minutes. The autoclave was then opened and the paste formed was dissolved in 5 times its quantity of water. This salt solution was adjusted to a pH value of 9.1 by introducing carbon dioxide, heated at 210° C. for 1 hour with 100 cc. of a nickel-magnesia-kieselguhr catalyst (100 Ni, 10 MgO, 50 kieselguhr) in an autoclave under a hydrogen pressure of 100 kg./sq. cm. while stirring, and then allowed to cool. The salt solution filtered off from the catalyst was colorless and water-clear. 400 cc. of ethanol denatured with petroleum ether were added to the salt solution and the unsaponifiable portion was removed by repeated stage-wise extraction with octadecane, dodecane, and heptane. Following this, the extraction residue was mixed with 20% sulfuric acid until a pH value of about 2 was reached, and the dicarboxylic acid thereby set free was dissolved in benzene. The benzene solution was washed two times with water, and the benzene was distilled off from the solution.

The further treatment was effected in accordance with Example 1 resulting in 140 grams of a solid dicarboxylic acid having a saponification number and a neutralization number of 488 and a melting point of 147° C. This carboxylic acid was identical with that obtained in Example 1.

Dicarboxylic acid was obtained in amount of 235 grams as a non-crystallizing viscous mass, all characteristics examined of which corresponded to those of the syrupy dicarboxylic acid of Example 1.

We claim:

1. Process for the production of isomeric dicarboxylic acids from monocyclic diolefinic terpenes, which comprises catalytically adding carbon monoxide and hydrogen in accordance with the oxosynthesis to a monocyclic diolefinic terpene having the empirical formula $C_{10}H_{16}$, converting the reaction product obtained into the corresponding dicarboxylic acids, dissolving the mixture of isomeric dicarboxylic acids in a solvent containing a mixture of heptane and pentanone in the ratio of 1:5 crystallizing an isomeric acid having the formula

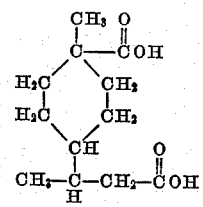

a clear melting point of 147° C. and a residual acid number of 190 from the solvent solution and recovering the other isomeric acid having the formula

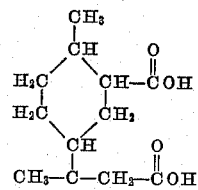

as a highly viscous and stringy compound having a residual acid number of 90 from the remaining solvent solution.

2. Process according to claim 1, in which said monocyclic diolefinic terpene is dipentene.

References Cited in the file of this patent

UNITED STATES PATENTS

| | | |
|---|---|---|
| 1,934,648 | Strosacker et al. | Nov. 7, 1933 |
| 2,153,311 | Pasternack et al. | Apr. 4, 1939 |
| 2,327,066 | Roelen | Aug. 17, 1943 |
| 2,435,403 | Morris et al. | Feb. 3, 1948 |
| 2,501,200 | Wearn | Mar. 21, 1950 |
| 2,584,539 | Bordenca et al. | Feb. 5, 1952 |
| 2,701,265 | Buchner | Feb. 1, 1955 |